United States Patent
Johannessen et al.

(10) Patent No.: US 11,318,882 B2
(45) Date of Patent: May 3, 2022

(54) COLOR CORRECTION METHOD FOR CHROMATIC ABERRATION USING MULTIPLE COLOR LED SOURCES

(71) Applicant: B/E AEROSPACE, INC., Winston Salem, NC (US)

(72) Inventors: Eric Johannessen, Holbrook, NY (US); Jameson Mauzy, Southwest Ranches, FL (US)

(73) Assignee: B/E AEROSPACE, INC., Winston Salem, NC (US)

(*) Notice: Subject to any disclaimer, the term of this patent is extended or adjusted under 35 U.S.C. 154(b) by 0 days.

(21) Appl. No.: 16/823,826

(22) Filed: Mar. 19, 2020

(65) Prior Publication Data
US 2021/0291726 A1    Sep. 23, 2021

(51) Int. Cl.
*B60Q 3/43* (2017.01)
*B60Q 3/47* (2017.01)
(Continued)

(52) U.S. Cl.
CPC ........... *B60Q 3/43* (2017.02); *B60Q 3/47* (2017.02); *B64D 11/00* (2013.01); *F21V 5/048* (2013.01); *B64D 2011/0038* (2013.01); *F21W 2106/00* (2018.01); *F21W 2107/30* (2018.01); *F21Y 2105/10* (2016.08); *F21Y 2113/13* (2016.08); *F21Y 2115/10* (2016.08)

(58) Field of Classification Search
CPC . B60Q 3/43; B60Q 3/47; B64D 11/00; B64D 2011/0038; B64D 2011/0053; F21V 5/048; F21W 2107/30; F21W 2106/00; F21Y 2113/13; F21Y 2115/10; F21Y 2105/10
See application file for complete search history.

(56) References Cited

U.S. PATENT DOCUMENTS

| 9,939,127 B2 | 4/2018 | Uchida et al. |
| 10,247,385 B2 | 4/2019 | Thijssen et al. |

(Continued)

FOREIGN PATENT DOCUMENTS

| CN | 103081144 A | * | 5/2013 | ......... G02B 19/0028 |
| KR | 10-1878666 | | 8/2018 | |

OTHER PUBLICATIONS

Concepts in Light and Optics—Lenses—Part 1; Esco Optics, Inc. ,https://escooptics.com/blogs/news/concepts-in-light-and-optics-lenses-part-1 ,Hill (Year: 2017).*

(Continued)

*Primary Examiner* — Rajarshi Chakraborty
*Assistant Examiner* — Glenn D Zimmerman
(74) *Attorney, Agent, or Firm* — Snell & Wilmer L.L.P.

(57) ABSTRACT

A lighting device is disclosed. In various embodiments, the lighting device includes an optical system; a plurality of light sources arranged in a matrix, the plurality of light sources including a first plurality of light sources configured to irradiate a first region of the optical system with a first light color, a second plurality of light sources configured to irradiate a second region of the optical system with a second light color; and a processor configured to control interaction of the first plurality of light sources and the second plurality of light sources with a third plurality of light sources and to control mixing of the first light color and the second light color.

14 Claims, 6 Drawing Sheets

(51) Int. Cl.
  *B64D 11/00*   (2006.01)
  *F21V 5/04*   (2006.01)
  *F21Y 113/13*   (2016.01)
  *F21Y 105/10*   (2016.01)
  *F21Y 115/10*   (2016.01)
  *F21W 107/30*   (2018.01)
  *F21W 106/00*   (2018.01)

(56) References Cited

U.S. PATENT DOCUMENTS

| | | | |
|---|---|---|---|
| 2003/0053310 A1* | 3/2003 | Sommers | F21V 14/06 |
| | | | 362/231 |
| 2004/0038390 A1* | 2/2004 | Boege | B01L 7/52 |
| | | | 435/288.7 |
| 2004/0218387 A1* | 11/2004 | Gerlach | F21K 9/00 |
| | | | 362/231 |
| 2010/0124247 A1* | 5/2010 | Kaltenbach | H05B 7/148 |
| | | | 373/104 |
| 2010/0244061 A1 | 9/2010 | Shirakawa et al. | |
| 2012/0001555 A1 | 1/2012 | Tu et al. | |
| 2014/0306249 A1 | 10/2014 | Tachino et al. | |
| 2019/0063713 A1* | 2/2019 | Hessling-Von Heimendahl | |
| | | | B64D 47/02 |

OTHER PUBLICATIONS

European Patent Office, European Search Report dated Jul. 28, 2021 in Application No. 21163713.7.

* cited by examiner

COLOR CORRECTION METHOD FOR CHROMATIC ABERRATION USING MULTIPLE COLOR LED SOURCES

FIELD

The present disclosure relates generally to methods and apparatus for interior lighting of an aircraft cabin and, more particularly, to methods and apparatus configured to provide illumination for passengers seated within an aircraft cabin.

BACKGROUND

In aircraft cabins, various different light sources are typically used. For example, sidewall lights may be arranged in recesses at sidewall panels or ceiling portions to provide a general illumination of the aircraft cabin. These lights may be switched off during takeoff and landing and may also be switched off during nighttime flights. Additionally, aircraft are typically provided with reading lights that are usually integrated within a passenger service unit (PSU), which is typically located at a lower portion of a luggage compartment overhead of a seated passenger. For each passenger aircraft seat, a separate reading light is provided that is configured for switching on and off by the passenger. Each such reading light typically provides a focused and geometrically defined light spot to the passenger, and in particular to an area that may be defined as a reading area. The reading area may, for example, comprise a portion of the surface area of a stowable tray located in front of the passenger or a larger area that includes both the tray and the lap of the passenger. Advances in light emitting diode ("LED") technology have made LEDs an ideal source of light where low-powered lighting solutions are desirable, such as in an aircraft, where power availability is limited. Among such advances are techniques used to reduce or eliminate chromatic aberration or similar distortions that may occur with aircraft lighting units or reading lights.

SUMMARY

A lighting device is disclosed. In various embodiments, the lighting device includes an optical system; a plurality of light sources arranged in a matrix, the plurality of light sources including a first plurality of light sources configured to irradiate a first region of the optical system with a first light color, a second plurality of light sources configured to irradiate a second region of the optical system with a second light color; and a processor configured to control interaction of the first plurality of light sources and the second plurality of light sources with a third plurality of light sources and to control mixing of the first light color and the second light color.

In various embodiments, a central axis extends through the optical system and the first plurality of light sources is disposed about the central axis. In various embodiments, the second plurality of light sources is disposed about the central axis between the first plurality of light sources and the central axis. In various embodiments, the third plurality of light sources is disposed about the central axis between the second plurality of light sources and the central axis.

In various embodiments, the first region defines a first annular region within a peripheral portion of the optical system. In various embodiments, the second region defines a second annular region within the peripheral portion of the optical system. In various embodiments, the third plurality of light sources is configured to irradiate a circular area radially inward of the second annular region.

In various embodiments, the first light color has a wavelength within a range of 625-740 nanometers. In various embodiments, the second light color has the wavelength within the range of 500-565 nanometers. In various embodiments, the third plurality of light sources is configured to generate a white light beam on a circular area radially inward of the second region. In various embodiments, the third plurality of light sources comprises a plurality of red light emitting diodes, a plurality of green light emitting diodes and a plurality of blue light emitting diodes.

In various embodiments, the optical system is configured to combine the first light color and the second light color at a periphery of a lens within the optical system. In various embodiments, the lens is a convex lens. In various embodiments, the convex lens is a biconvex lens or a plano-convex lens.

A method of producing a white light beam is disclosed. In various embodiments, the method includes the steps of illuminating a first region of an optical system with a first light color; illuminating a second region of the optical system with a second light color, the second region positioned inward of the first region with respect to a central axis; illuminating a central region of the optical system with a third light color, the central region positioned inward of the second region with respect to the central axis; and refracting light from the first region, the second region and the central region by the optical system to generate a beam of white light throughout a light spot projected onto a target surface by the optical system.

In various embodiments, the first light color has a wavelength within a range of 625-740 nanometers. In various embodiments, the second light color has the wavelength within the range of 500-565 nanometers. In various embodiments, the third light color is a white color generated via a plurality of red light sources, a plurality of green light sources and a plurality of blue light sources.

In various embodiments, the first region defines a first annular region within a peripheral portion of the optical system and the second region defines a second annular region within the peripheral portion of the optical system. In various embodiments, the optical system is configured to combine the first light color, the second light color and the third light color at the peripheral portion of the optical system.

The forgoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
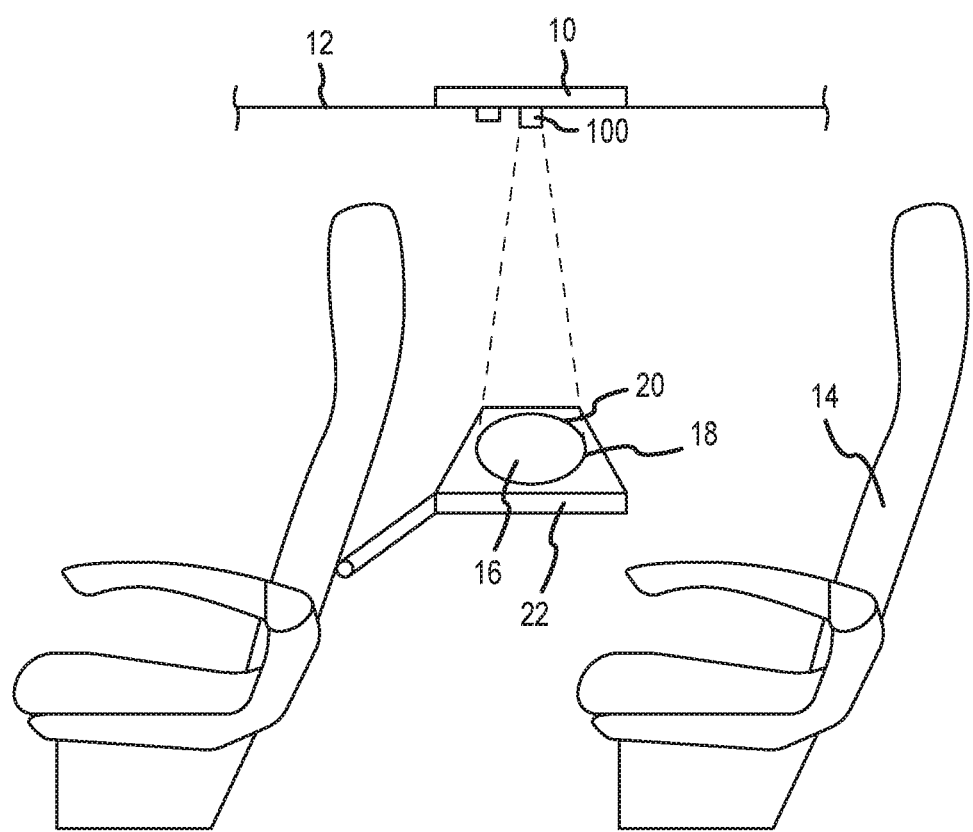
FIG. 1 illustrates a passenger seat having a reading light disposed in a personal seating unit, in accordance with various embodiments.

Referring now to the drawings, FIG. 1 illustrates a lighting device 100 mounted on or within a passenger service unit 10 located at a lower portion of a luggage compartment 12 overhead of a passenger seat 14. As described in further detail below, the lighting device 100 includes a plurality of light sources arranged in an array or a matrix and configured to reduce or eliminate a chromatic aberration that may result from an optic system or lens system within the lighting device 100. As illustrated, for example, the chromatic aberration may result in a light spot 16 having a fringe-like distortion 18 at a periphery 20 of the light spot 16. While the light spot 16 is illustrated as being confined to the surface area of a stowable tray 22 located in front of the passenger seat 14, the light spot 16 contemplated herein is not so limited in size and may, in various embodiments, span a larger area that includes both the stowable tray 22 and the lap of a passenger seated within the passenger seat 14.

Figure 2:
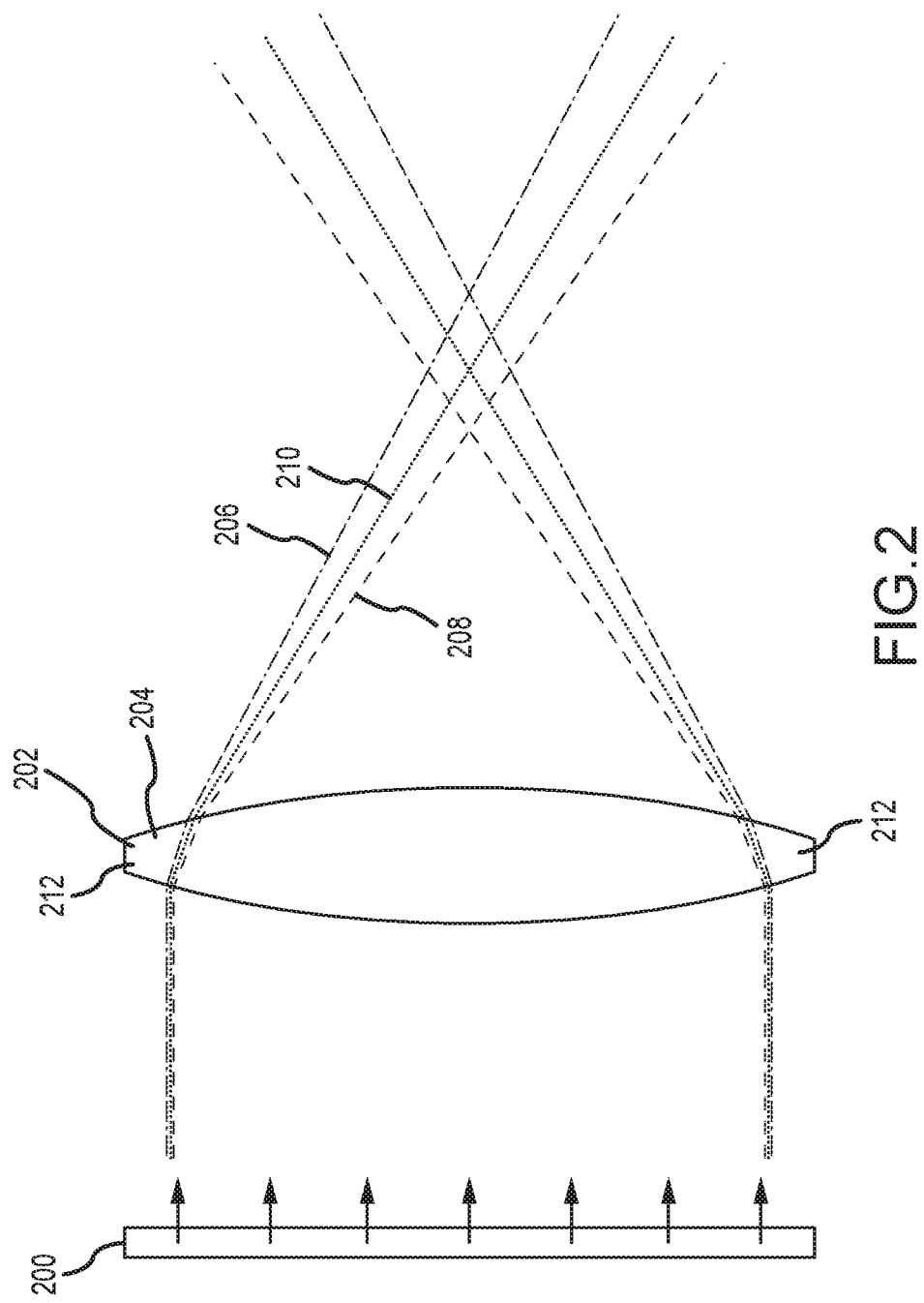
FIG. 2 is a schematic illustration of a convex lens displaying a chromatic aberration, in accordance with various embodiments.

With reference now to FIG. 2, the phenomena of chromatic aberration may be described, in accordance with various embodiments. When light (e.g., white light) irradiated from a light source 200 passes through an optic system 202, such as, for example, a convex lens 204, the components of the light being irradiated typically have different wavelengths and thus have different refractive indices. Therefore, a red light component 206 having a relatively long wavelength (e.g., within a range of 625-740 nanometers (nm)) has a relatively low refractive index, a blue light component 208 having a relatively short wavelength (e.g., within a range of 450-485 nm) has a relatively high refractive index, and a green light component 210 having an intermediate wavelength (e.g., within a range of 500-565 nm) has a refractive index between the refractive indices of the red light component 206 and the blue light component 208. The light that passes through the peripheral portion 212 of the convex lens 204 causes the color blurring due to the difference in refractive indices in accordance with the light components. As described further below, methods and apparatus configured to precondition the light prior to being refracted by the optic system 202 may substantially reduce or even eliminate the chromatic aberration.

Figure 3A:
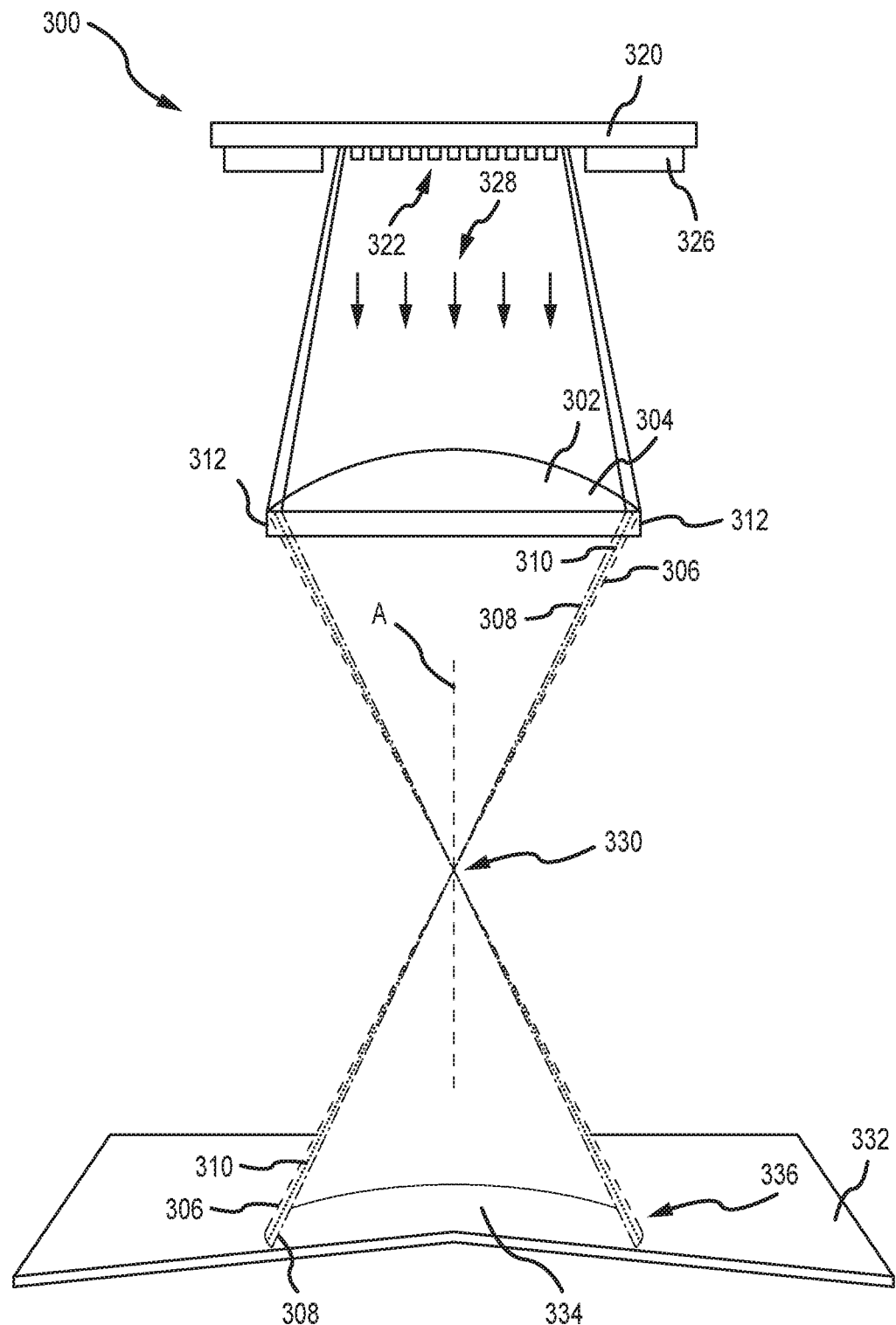
FIGS. 3A and 3B illustrate a reading light displaying a chromatic aberration in FIG. 3A and no aberration in FIG. 3B, in accordance with various embodiments.
Figure 3B:
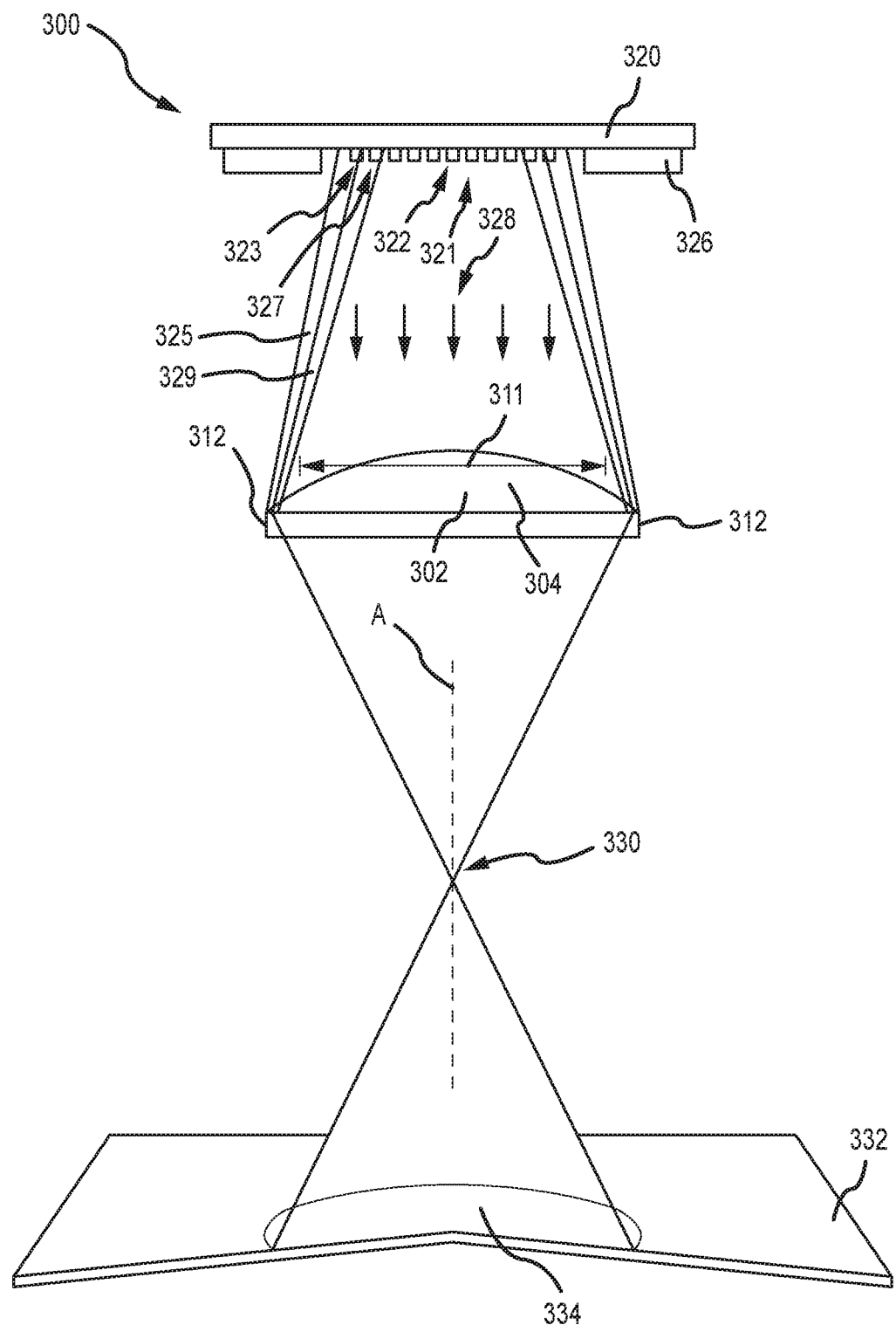

Referring now to FIGS. 3A and 3B, a lighting device 300, such as, for example, the lighting device 100 described above with reference to FIG. 1, is illustrated. In various embodiments, the lighting device 300 includes a printed circuit board 320. A plurality of light sources 322 is mounted to the printed circuit board 320 in a matrix or an array (e.g., a 10×10, a 20×20, . . . or a N×M matrix or array, where N and M represent the number of light sources in the rows and columns of the matrix or array). In various embodiments, the plurality of light sources 322 comprises a plurality of light emitting diodes (LEDs). Typically, the plurality of light sources 322 comprises various colors, including, for example, red, green and blue LEDs that may be controlled by a processor 326 to generate a desired color of light, including white light. For example, the red, green and blue LEDs may be mixed throughout the matrix or array and controlled by the processor 326 to produce a blended source of light to produce a white light or some other desired color that results from the mixing of the red, green and blue colors. Note that while the disclosure is described in general terms using LEDs as the light sources within the plurality of lights sources 322, other light sources are contemplated, such as, for example, digital light processing (DLP), liquid crystal display (LCD), liquid crystal on silicon (LCoS), organic light emitting diode (OLED) and quantum dot (QD) sources.

Referring more particularly to FIG. 3A, the lighting device 300 is illustrated as operating in a white light state. In the white light state, operation of the individual red, green and blue LEDs within the plurality of light sources 322 are controlled by the processor 326 to produce a white light beam 328 that is incident on an optical system 302, such as, for example, a convex lens 304 (e.g., a biconvex lens having convex surfaces on both sides of the lens (as illustrated in FIG. 2) or a plano-convex lens having a plane surface on one side of the lens and a convex surface of the other side of the lens (as illustrated in FIGS. 3A and 3B)). In various embodiments, a central axis A extends longitudinally through the plurality of light sources 322 and the optical system 302. Similar to the description provided above with reference to FIG. 2, the white light beam 328 experiences refraction, particularly at a peripheral portion 312 of the convex lens 304, causing the color blurring due to the difference in refractive indices in accordance with the red, green and blue light components. As illustrated, the color blurring, or chromatic aberration, results in a red component 306, a blue component 308 and a green component 310 of the white light beam 328 being refracted at different angles by the convex lens 304, thereby resulting in the blurring or aberration. Due to the light converging nature of the convex lens 304, the white light beam 328, together with the blurred region comprising the red component 306, the blue component 308 and the green component 310, to pass through a focal point 330 (or a focal region if spherical aberration is present due to various surface imperfections in the convex lens 304). After passing through the focal point 330, the light beam continues toward a target surface 332, which, in various embodiments, may comprise a stowable tray, such as the stowable tray 22 described above with reference to FIG.

1. A light spot 334 is projected on the target surface 332 and includes a fringe 336 at a periphery of the light spot 334, the fringe 336 resulting from the color blurring or the chromatic aberration due to the difference in refractive indices of the red component 306, the blue component 308 and the green component 310 refracted at different angles by the convex lens 304.

Referring more particularly now to FIG. 3B, the lighting device 300 is illustrated as operating in a preconditioned light state. In the preconditioned light state, operation of the individual red, green and blue LEDs within the plurality of light sources 322 are controlled by the processor 326 to produce a white light beam 328 that is incident on a central portion 311 of the convex lens 304 that lies inward of the peripheral portion 312. At the same time, a first plurality of light sources 323 of the plurality of light sources 322 is controlled by the processor 326 to irradiate red light within a first region 325 and a second plurality of light sources 327 of the plurality of light sources 322 is controlled by the processor 326 to irradiate green light within a second region 329. In various embodiments, the first region 325 is a first annular region that irradiates the red light toward a first peripheral region within the peripheral portion 312 of the convex lens 304. Similarly, the second region 329 is a second annular region that irradiates the green light toward a second peripheral region within the peripheral portion 312 of the convex lens 304, with the second peripheral region being radially inward of the first peripheral region. In various embodiments, the white light beam 328 that is incident on the central portion 311 of the convex lens 304 is generated by a third plurality of light sources 321, which is generally surrounded by the second plurality of light sources 327, which is generally surrounded by the first plurality of light sources 323. In various embodiments, the third plurality of light sources 321 is configured to irradiate a circular area radially inward of the second annular region.

In a manner similar to the description above, light of the various colors will be refracted by the convex lens 304 at the peripheral portion 312. In various embodiments represented by FIG. 3B, however, the various red, green and blue color components are controlled by the processor 326 to combine and produce a white light at the location where the fringe 336, as illustrated in FIG. 3A, previously existed. For example, the red light within the first region 325 is refracted a first angle by the convex lens and the green light within the second region 329 is refracted at second angle. At the same time, the red, green and blue components of the white light beam 328 are refracted at a location radially inward of the second region 329, though not at angles as great as those described above with reference to FIG. 3A. The result is the contributions of the red light from the first region 325, the green light from the second region 329 and the red, green and blue light from the white light beam 328 may be mixed at the peripheral portion 312 of the convex lens 304 to produce a white light and to substantially reduce or eliminate the color blurring or chromatic aberration described above. Accordingly, the light exiting the convex lens 304 is white in color throughout the entire light beam. After passing through the focal point 330, the light beam continues toward the target surface 332. A light spot 334 that results is projected on the target surface 332, but no longer includes the fringe 336 at the periphery of the light spot 334 described above with reference to FIG. 3A.

Figure 4:
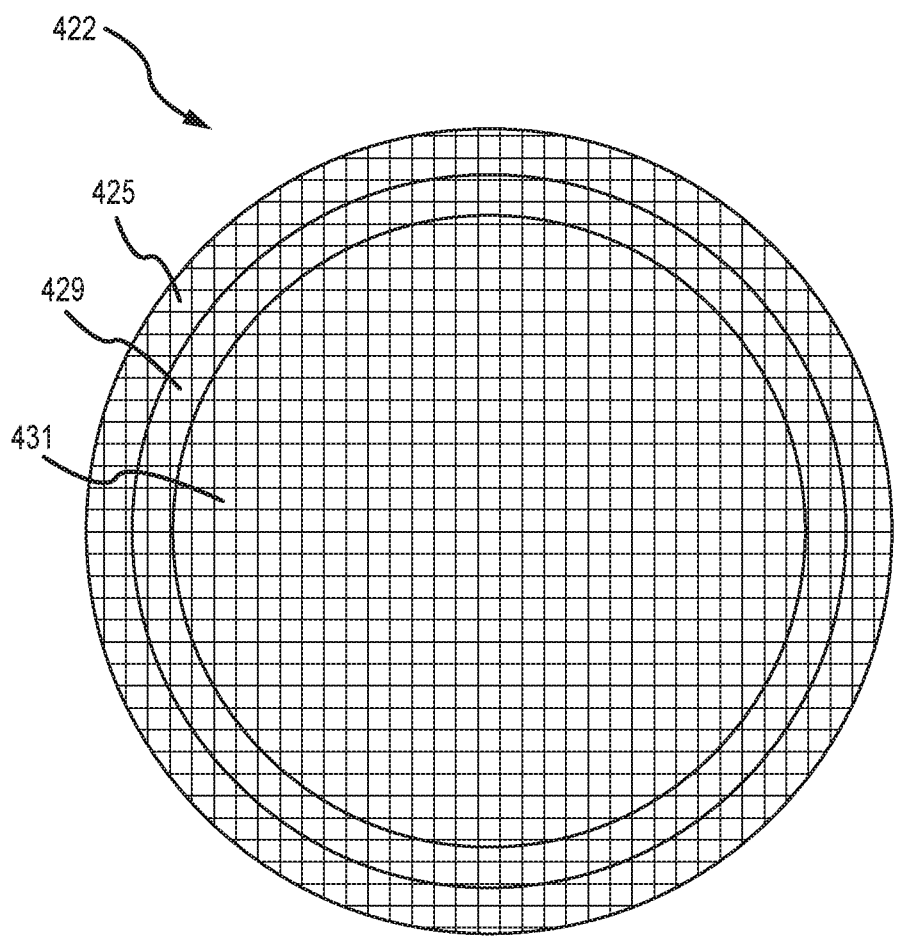
FIG. 4 illustrates a plurality of light sources configured to reduce or eliminate a chromatic aberration in a reading light, in accordance with various embodiments.

Referring now to FIG. 4, a schematic illustration of a plurality of light sources 422, similar to the plurality of light sources 322 described above with reference to FIGS. 3A and 3B, is provided. Similar to the foregoing description, the plurality of light sources 422 may include various red, green and blue colored light sources that are intermixed and controlled by a processor (e.g., the processor 326 described above) to combine and produce a white light within a central region 431, a red light at a first region 425 and a green light at a second region 429, with the first region 425 being located radially outward of the second region 429 and the second region 429 being located radially outward of the central region 431. For example, in various embodiments, the red light at the first region 425 may be generated via a plurality or red light sources (e.g., a plurality of red light emitting diodes), the green light at the second region 429 may be generated via a plurality or green light sources (e.g., a plurality of green light emitting diodes) and the white light within the central region 431 may be generated via a combination of a plurality of red light sources, a plurality of green light sources and a plurality of blue light sources (e.g., a plurality of blue light emitting diodes). When directed at a convex lens, the contributions of the red light from the first region 425, the green light from the second region 429 and the red, green and blue light from the central region 431 may be mixed at a peripheral portion of the convex lens to produce a white light and to substantially reduce or eliminate the color blurring or chromatic aberration described above. Accordingly, the light exiting the convex lens is white in color throughout the entire light beam. After passing through a focal point, the light beam continues toward a target surface. A light spot that results is projected on the target surface, but without a fringe at the periphery of the light spot described above with reference to FIG. 3A.

Figure 5:
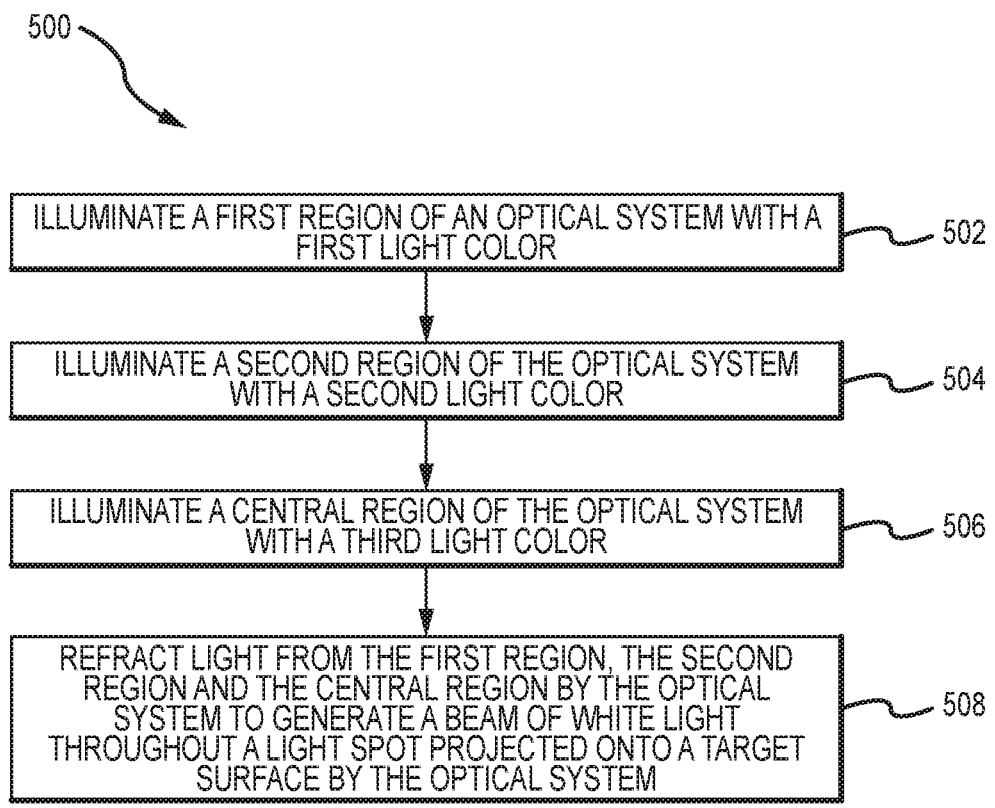
FIG. 5 describes various method steps used to reduce or eliminate a chromatic aberration in a reading light, in accordance with various embodiments.

With reference now to FIG. 5, a method 500 of producing a white light beam is described as having the following steps. A first step 502 includes illuminating a first region of an optical system with a first light color. A second 504 step includes illuminating a second region of the optical system with a second light color, the second region positioned inward of the first region with respect to a central axis. A third step 506 includes illuminating a central region of the optical system with a third light color, the central region positioned inward of the second region with respect to the central axis. A fourth step 508 includes refracting light from the first region, the second region and the central region by the optical system to generate a beam of white light throughout a light spot projected onto a target surface by the optical system.

In various embodiments, the first light color has a wavelength within a range of 625-740 nanometers and the second light color has the wavelength within the range of 500-565 nanometers. In various embodiments, the third light color is a white color generated via a plurality of red light sources, a plurality of green light sources and a plurality of blue light sources. In various embodiments, the first region defines a first annular region within a peripheral portion of the optical system and the second region defines a second annular region within the peripheral portion of the optical system. In various embodiments, the optical system is configured to combine the first light color, the second light color and the third light color at the peripheral portion of the optical system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system.

However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A lighting device, comprising:
   an optical system, the optical system including a convex lens;
   a plurality of light sources arranged in a matrix, the plurality of light sources including a first plurality of light sources configured to irradiate a first region of the optical system with a first light color, a second plurality of light sources configured to irradiate a second region of the optical system with a second light color; and
   a processor configured to control interaction of the first plurality of light sources and the second plurality of light sources with a third plurality of light sources and to control mixing of the first light color and the second light color,
      wherein the first region defines a first annular region within a peripheral portion of the optical system,
      wherein the peripheral portion of the optical system is configured to pass the first light color irradiated on the first region through a focal point and a target surface,
      wherein a central axis extends through the optical system and the first plurality of light sources is disposed about the central axis,
      wherein the second plurality of light sources is disposed about the central axis between the first plurality of light sources and the central axis,
      wherein the third plurality of light sources is disposed about the central axis between the second plurality of light sources and the central axis,
      wherein a convex surface of the convex lens extends towards the plurality of light sources, and
      wherein the first light color within the first region of the optical system is refracted a first angle by the convex lens and the second light color within the second region of the optical system is refracted at a second angle, different from the first angle, to produce a white light exiting the peripheral portion of the convex lens.

2. The lighting device of claim 1, wherein the second region defines a second annular region within the peripheral portion of the optical system.

3. The lighting device of claim 1, wherein the first light color has a wavelength within a range of 625-740 nanometers.

4. The lighting device of claim 2, wherein the third plurality of light sources is configured to irradiate a circular area radially inward of the second annular region.

5. The lighting device of claim 3, wherein the second light color has the wavelength within the range of 500-565 nanometers.

6. The lighting device of claim 5, wherein the third plurality of light sources is configured to generate a white light beam on a circular area radially inward of the second region.

7. The lighting device of claim 6, wherein the third plurality of light sources comprises a plurality of red light emitting diodes, a plurality of green light emitting diodes and a plurality of blue light emitting diodes.

8. The lighting device of claim 6, wherein the optical system is configured to combine the first light color and the second light color at a periphery of a lens within the optical system.

9. A method of producing a white light beam, comprising:
illuminating a first region of an optical system with a first light color;
illuminating a second region of the optical system with a second light color, the second region positioned inward of the first region with respect to a central axis;
illuminating a central region of the optical system with a third light color, the central region positioned inward of the second region with respect to the central axis; and
refracting light from the first region, the second region and the central region by the optical system to generate a beam of white light throughout a light spot projected onto a target surface by the optical system,
wherein the optical system comprises a convex lens,
wherein a convex surface of the convex lens extends in the direction of the optical system,
wherein the first region defines a first annular region within a peripheral portion of the optical system,
wherein the peripheral portion of the optical system is configured to pass the first light color illuminated on the first region through a focal point and toward the target surface, and
wherein the first light color within the first region of the optical system is refracted a first angle by the convex lens and the second light color within the second region of the optical system is refracted at a second angle, different from the first angle, to produce a white light exiting the peripheral portion of the convex lens.

10. The method of claim 9, wherein the first light color has a wavelength within a range of 625-740 nanometers.

11. The method of claim 10, wherein the second light color has the wavelength within the range of 500-565 nanometers.

12. The method of claim 11, wherein the third light color is a white color generated via a plurality of red light sources, a plurality of green light sources and a plurality of blue light sources.

13. The method of claim 12, wherein the first region defines a first annular region within the peripheral portion of the optical system and the second region defines a second annular region within the peripheral portion of the optical system.

14. The method of claim 13, wherein the optical system is configured to combine the first light color, the second light color and the third light color at the peripheral portion of the optical system.

* * * * *